United States Patent
Haryadi et al.

(10) Patent No.: US 12,159,132 B2
(45) Date of Patent: *Dec. 3, 2024

(54) OBTAINING SOFTWARE UPDATES FROM NEIGHBORING HOSTS IN A VIRTUALIZED COMPUTING SYSTEM

(71) Applicant: VMware LLC, Palo Alto, CA (US)

(72) Inventors: Aravinda Haryadi, Bangalore (IN); Mukund Gunti, Sunnyvale, CA (US); Ritesh Ranjan, Bangalore (IN); Dipesh Kumar, Bangalore (IN); Yuedong Mu, Palo Alto, CA (US); Geoffrey Blair Fritz, Indianapolis, IN (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/360,162

(22) Filed: Jul. 27, 2023

(65) Prior Publication Data

US 2023/0385052 A1    Nov. 30, 2023

Related U.S. Application Data

(63) Continuation of application No. 17/665,632, filed on Feb. 7, 2022, now Pat. No. 11,748,089.

(30) Foreign Application Priority Data

Dec. 2, 2021 (IN) .............................. 202141055904

(51) Int. Cl.
*G06F 8/65* (2018.01)
*G06F 8/61* (2018.01)
*G06F 9/455* (2018.01)
*H04L 67/00* (2022.01)

(52) U.S. Cl.
CPC .................. *G06F 8/65* (2013.01); *G06F 8/63* (2013.01); *G06F 9/45558* (2013.01); *H04L 67/34* (2013.01); *G06F 2009/45595* (2013.01)

(58) Field of Classification Search
None
See application file for complete search history.

(56) References Cited

U.S. PATENT DOCUMENTS

| 8,208,477 | B1 | 6/2012 | Xiong et al. | |
| 9,361,089 | B2 * | 6/2016 | Bradfield | G06F 8/65 |
| 9,513,895 | B2 * | 12/2016 | Inamdar | G06F 8/65 |
| 10,261,775 | B1 | 4/2019 | Ramsay et al. | |
| 11,748,089 | B2 * | 9/2023 | Haryadi | G06F 8/65 |
| | | | | 717/168 |
| 11,842,181 | B2 * | 12/2023 | Haryadi | G06F 9/45558 |
| 2006/0130037 | A1 | 6/2006 | Mackay | |

(Continued)

*Primary Examiner* — Marina Lee
(74) *Attorney, Agent, or Firm* — Kim & Stewart LLP (57) ABSTRACT

An example method of upgrading a host in a cluster under management of a lifecycle manager in a virtualized computing system includes: receiving, from the lifecycle manager at a host in the cluster being upgraded, a desired software specification for a hypervisor of the host; determining, by the host, a list of required software installation bundles (SIBs) to satisfy the desired software specification; identifying a neighboring host in the cluster for the host; downloading, from the neighboring host to the host, at least a portion of the required SIBs; and executing an upgrade of the hypervisor in the host using the required SIBs.

20 Claims, 6 Drawing Sheets

(56) References Cited

U.S. PATENT DOCUMENTS

| | | |
|---|---|---|
| 2019/0317750 A1 | 10/2019 | Ramsay et al. |
| 2022/0188091 A1* | 6/2022 | Li .................. G06F 9/45558 |
| 2022/0229644 A1* | 7/2022 | He .................. G06F 21/572 |
| 2023/0004413 A1 | 1/2023 | Kaila et al. |

* cited by examiner

OBTAINING SOFTWARE UPDATES FROM NEIGHBORING HOSTS IN A VIRTUALIZED COMPUTING SYSTEM

CROSS-REFERENCE

This application is a continuation of U.S. patent application Ser. No. 17/665,632, filed Feb. 7, 2022, now U.S. Pat. No. 11,748,089, issued Sep. 5, 2023, which claims benefit under 35 U.S.C. 119(a)-(d) to India patent application Ser. No. 202141055904, filed Dec. 2, 2021, each of which are herein incorporated by reference in their entirety for all purposes.

BACKGROUND

Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. A virtual infrastructure administrator ("VI admin") interacts with a virtualization management server to create server clusters ("host clusters"), add/remove servers ("hosts") from host clusters, deploy/move/remove VMs on the hosts, deploy/configure networking and storage virtualized infrastructure, and the like. The virtualization management server sits on top of the server virtualization layer of the SDDC and treats host clusters as pools of compute capacity for use by applications.

There can be many steps to create a host cluster in an SDDC, many of which can be time consuming, error-prone, and require domain expertise. Techniques have been developed to manage the lifecycle of a host cluster, including creation of the host cluster, addition of hosts to the host cluster, management of the virtualization software in the host cluster, and the like. In some techniques, the host cluster's lifecycle is managed using a desired image of the virtualization software installed on each host. During updates, all hosts under management must download software installation bundles (SIB s) from a cache the virtualization management server, which could be 400 Megabytes (MB) or more data. In addition, the virtualization management server can manage hundreds of hosts and can be located far from some of the hosts in terms of being in different geolocations and/or different sub-networks. In addition, the if the virtualization management server is unavailable, then the hosts cannot obtain the necessary SIB s for performing the update. It is therefore desirable to decentralize distribution of SIBs for updating hosts in a cluster for lifecycle management operations.

SUMMARY

An example method of upgrading a host in a cluster under management of a lifecycle manager in a virtualized computing system includes: receiving, from the lifecycle manager at a host in the cluster being upgraded, a desired software specification for a hypervisor of the host; determining, by the host, a list of required software installation bundles (SIBs) to satisfy the desired software specification; identifying a neighboring host in the cluster for the host; downloading, from the neighboring host to the host, at least a portion of the required SIBs; and executing an upgrade of the hypervisor in the host using the required SIBs.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

FIG. is a block diagram depicting generation of SIBs from a host according to an embodiment.

DETAILED DESCRIPTION

Figure 1:
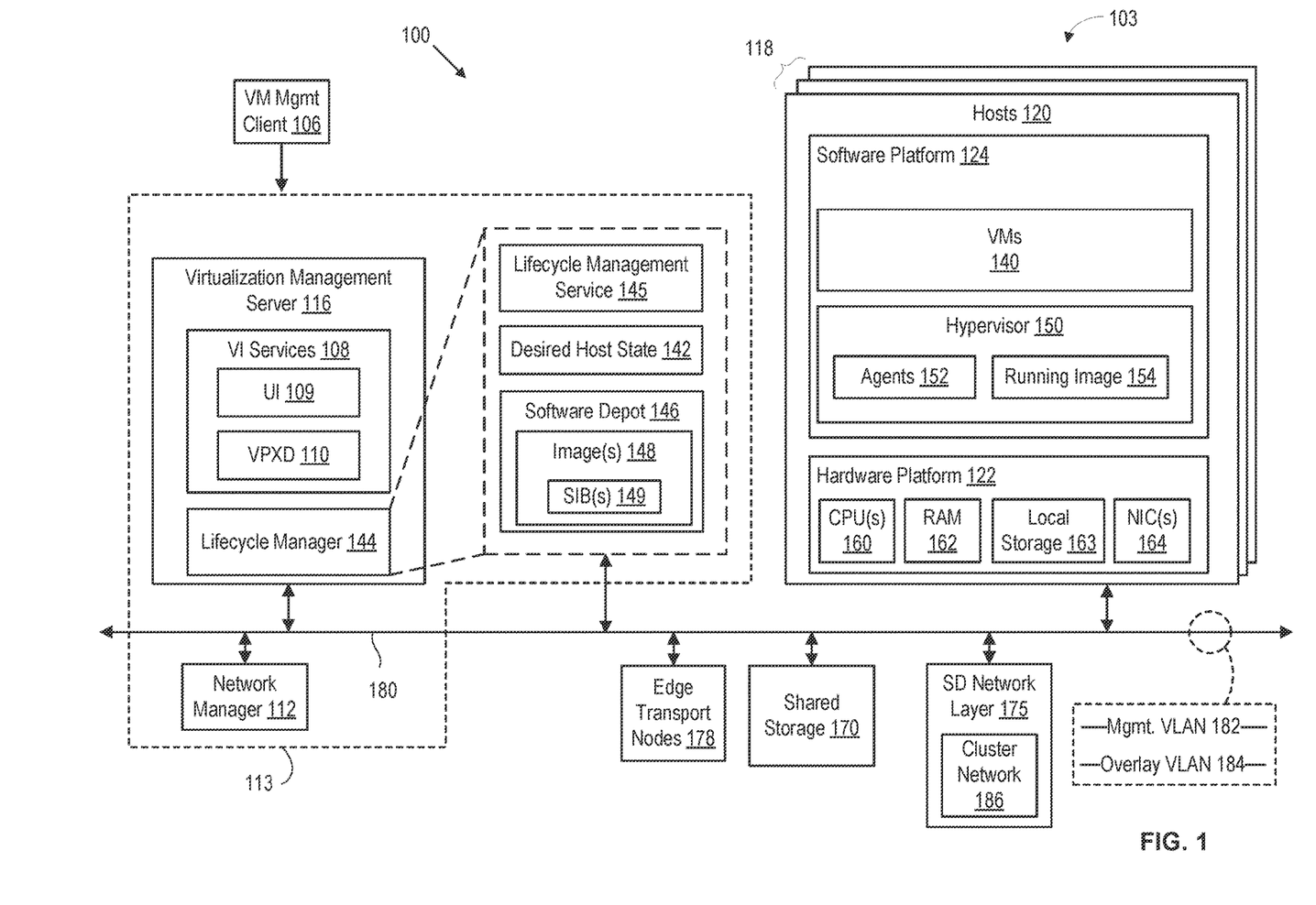
FIG. 1 is a block diagram of a virtualized computing system in which embodiments described herein may be implemented.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

In the embodiment illustrated in FIG. 1, hosts 120 access shared storage 170 by using NICs 164 to connect to network 180. In another embodiment, each host 120 contains a host bus adapter (HBA) through which input/output operations (ICs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks (SSDs), flash memory, and the like as well as combinations thereof. In some embodiments hosts 120 include local storage 163 (e.g., hard disk drives, solid-state drives, etc.). Local storage 163 in each host 120 can be aggregated and provisioned as part of a virtual SAN (vSAN), which is another form of shared storage 170. Virtualization management server 116 can select which local storage devices in hosts 120 are part of a vSAN for host cluster 118.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. One example of hypervisor 150 that may be configured and used in embodiments described herein is a VMware hypervisor provided as part of the VMware vSphere® solution made commercially available by VMware, Inc. of Palo Alto, CA. An embodiment of software platform 124 is discussed further below with respect to FIG. 2.

In embodiments, host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.). Edge transport nodes 178 can include a gateway between the internal logical networking of host cluster 118 and the external network. Edge transport nodes 178 can be physical servers or VMs.

Virtualization management server 116 is a physical or virtual server that manages host cluster 118 and the virtualization layer therein. Virtualization management server 116 installs agent(s) 152 in hypervisor 150 to acid a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualized computing system 100 further includes a network manager 112. Network manager 112 is a physical or virtual server that orchestrates SD network layer 175. In an embodiment network manager 112 comprises one or more virtual servers deployed as VMs. Network manager 112 installs additional agents 152 in hypervisor 150 to add a host 120 as a managed entity, referred to as a transport node in this manner, host cluster 118 can be a cluster 103 of transport nodes. One example of an SD networking platform that can be configured and used in embodiments described herein as network manager 112 and SD network layer 175 is a VMware NSX® platform made commercially available by VMware, Inc. of Palo Alto, CA.

Network manager 112 can deploy one or more transport zones in virtualized computing system 100, including VLAN transport zones) and an overlay transport zone. A VLAN transport zone spans a set of hosts 120 (e.g., host cluster 118) and is backed by external network virtualization of physical network 180 (e.g., a VLAN), One example VLAN transport zone uses a management VLAN 182 on physical network 180 that enables a management network connecting hosts 120 and the VI control plane (e.g., virtualization management server 116 and network manager 112). An overlay transport zone using overlay VLAN 184 on physical network 180 enables an overlay network that spans a set of hosts 120 (e.g., host cluster 118) and provides internal network virtualization using software components (e.g., the virtualization layer and services executing in VMs). Host-to-host traffic for the overlay transport zone is carried by physical network 180 on the overlay VLAN 184 using layer-2-over-layer-3 tunnels. Network manager 112 can configure SD network layer 175 to provide a cluster network 186 using the overlay network. The overlay transport zone can be extended into at least one of edge transport nodes 178 to provide ingress/egress between cluster network 186 and an external network.

Virtualization management server 116 and network manager 112 comprise a virtual infrastructure (VI) control plane 113 of virtualized computing system 100. In embodiments, network manager 112 is omitted and virtualization management server 116 handles virtual networking. Virtualization management server 116 can include VI services 108. VI services 108 include various virtualization management services, such as a user interface (UI) 109, a distributed resource scheduler (DRS), high-availability (HA) service, single sign-on (SSO) service, virtualization management daemon (vpxd) 110, vSAN service, and the like. UI 109 is configured to interface with users (receive input from, and provide output, to users). Vpxd 110 is configured to manage objects, such as data centers, clusters, hosts, VMs, resource pools, datastores, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, and the like.

Virtualization management server 116 further includes a lifecycle manager 144. Lifecycle manager 144 is configured to manage the lifecycle of software installed on hosts 120, including hypervisor 150 and its components. Lifecycle management includes installation of software, maintenance of installed software through updates and upgrades, and uninstalling the software. Lifecycle manager 144 includes a lifecycle management service 145 and a software depot 146. Lifecycle management service 145 is configured to perform various processes described herein for lifecycle management of hypervisors 150. Software depot 146 is configured to store at least one software image (image 148"). Image 148 includes a collection of software to be installed on a host 120 to implement hypervisor 150, linage 148 includes a plurality of components, each of which includes one or more software installation bundles (SIBs) 149. The components can be logically organized into component collections, such as a base image, add-ons, firmware/drivers, and the like.

According to embodiments, SIBs are logically grouped into "components." Each SIB includes metadata (e.g., included in an extensible markup language (XML) file), a signature, and one or more payloads. A payload includes a file archive. In the embodiments, a component is a unit of shipment and installation, and a successful installation of a component typically will appear to the end user as enabling some specific feature of hypervisor 150. For example, if a software vendor wants to ship a user-visible feature that requires a plug-in, a driver, and a solution, the software vendor will create separate SIBs for each of the plug-in, the driver, and the solution, and then group them together as one component. From the end user's perspective, it is sufficient to install this one component onto a server to enable this feature on the server. A component may be part of a collection, such as a base image or an add-on, as further described below, or it may be a stand-alone component provided by a third-party or the end user (hereinafter referred to as "user component").

A "base image" is a collection of components that are sufficient to boot up a server with the virtualization software. For example, the components for the base image include a core kernel component and components for basic drivers and in-box drivers. The core kernel component is made up of a kernel payload and other payloads that have inter-dependencies with the kernel payload. According to embodiments, the collection of components that make up the base image is packaged and released as one unit.

An "add-on" or "add-on image" is a collection of components that an original equipment manufacturer (OEM) wants to bring together to customize its servers. Using add-ons, the OEM can add, update or remove components that are present in the base image. The add-on is layered on top of the base image and the combination includes all the drivers and solutions that are necessary to customize, boot up and monitor the OEM's servers. Although an "add-on" is always layered on top of a base image, the add-on content and the base image content are not tied together. As a result, an OEM is able to independently manage the lifecycle of its releases. In addition, end users can update the add-on content and the base image content independently of each other.

"Solutions" are features that indirectly impact the desired image when they are enabled by the end user. In other words, the end-user decides to enable the solution in a user interface but does not decide what components to install. The solution's management layer decides the right set of components based on constraints. Examples solutions include HA (high availability) and NSX (network virtualization platform).

Lifecycle management service 145 maintains a desired host state 142. Desired host state 142 includes a target software specification and a target configuration for each host 120 in cluster 118 (e.g., each host 120 under management of lifecycle manager 144). The software specification can include a software image to be installed on each host 120 to implement hypervisor 150 (e.g., image 148). Hypervisor 150 in each host 120 includes software of a running image 154. Lifecycle management service 145 manages hosts 120 such that running image 154 conforms to desired host state 142. For example, lifecycle management service 145 can install image 148 specified in desired host state 142 to one or more hosts 120. In case running image 154 differs from image 148 specified in desired host state 142, lifecycle management service 145 can perform remediation of host(s) 120. Remediation includes updating, patching, upgrading, uninstalling, installing, and the like to cause running image 154 to conform to desired host state 142.

For upgrade operations, hosts 120 can obtain SIBs 149 necessary to conform to desired host state 142 from lifecycle manager 144 (e.g., software depot 146). In embodiments, a host 120 can also obtain all or a portion of the necessary SIBs from neighboring hosts 120. In embodiments, a host 120 being upgraded can identify neighboring hosts 120 by itself and obtain a list of available SIBs. In other embodiments, lifecycle manager 144 can provide a list of neighboring hosts for use by a host 120 being upgraded. This avoids virtualization management server 116 being a bottleneck when multiple hosts 120 are, being upgraded in parallel. Further, hosts that obtain the necessary SIBs from neighboring hosts can be more efficiently upgraded in cases where the hosts are located in a different geolocation and/or sub-network than the virtualization management server 116.

Figure 2:
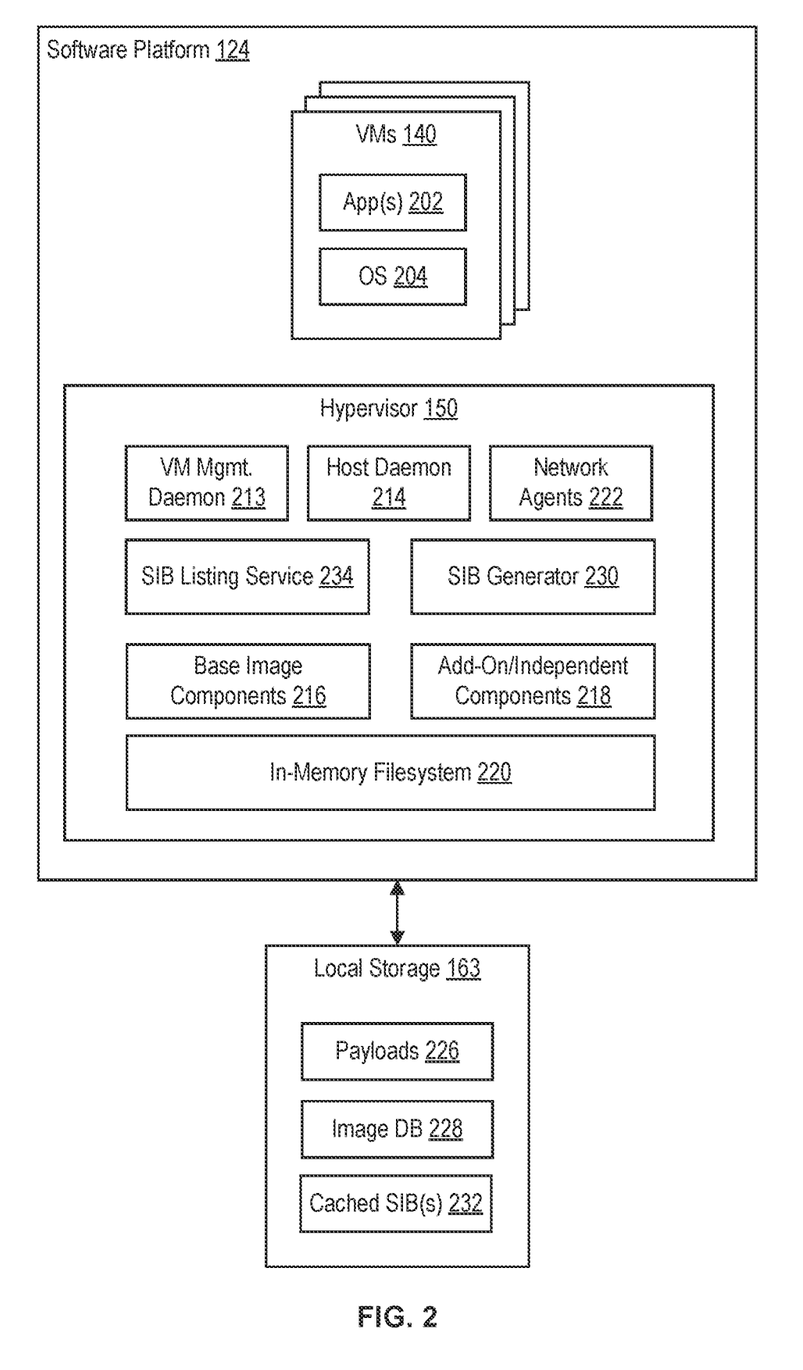
FIG. 2 is a block diagram depicting a software platform according to an embodiment.

FIG. 2 is a block diagram depicting software platform 124 according to an embodiment. As described above, software platform 124 of host 120 includes hypervisor 150 that supports execution of VMs 140. In an embodiment, hypervisor 150 includes a VM management daemon 213, a host daemon 214, network agents 222, SIB listing service 234, and SIB generator 230. VM management daemon 213 is an agent 152 installed by virtualization management server 116. VM management daemon 213 provides an interface to host daemon 214 for virtualization management server 116 host daemon 214 is configured to create, configure, and remove VMs, as well as coordinate upgrades of hypervisor 150. Network agents 222 comprises agents 152 installed by network manager 112. Network agents 222 are configured to cooperate with network manager 112 to implement logical network services. Network agents 222 configure the respective host as a transport node in a cluster 103 of transport nodes, SIB listing service 234 is configured to receive requests from hosts for a list of SIBs used to install running image 154. SIB generator 230 is configured to recreate SIBs if necessary, as described further below. Each VM 140 has applications 202 running therein on top of an OS 204.

Hypervisor 150 includes base image components 216 and add-on/independent components 218. Base image components 216 include various components of a base image (e.g., kernel, virtual machine monitor, drivers, VM management daemon 213, host daemon 214, network agents 222, SIB listing service 234, SIB generator 230, etc.). Add-on/independent components 218 include various components of add-on(s) or other independent components. Base image components 216 and add-on/independent components 218 are executed from binaries stored in an in-memory file system 220. Local storage 163 stores payloads 226 and image database (DB) 228. Image database 228 includes metadata and signatures for running image 154 (e.g., which SIBs are installed, version information, base image, add-ons, etc.). Payloads 226 include file archives that are extracted during hoot to form in-memory filesystem 220. After recreating SIB s, SIB generator 230 can store cached SIBs 232 on local storage 163.

Figure 3:
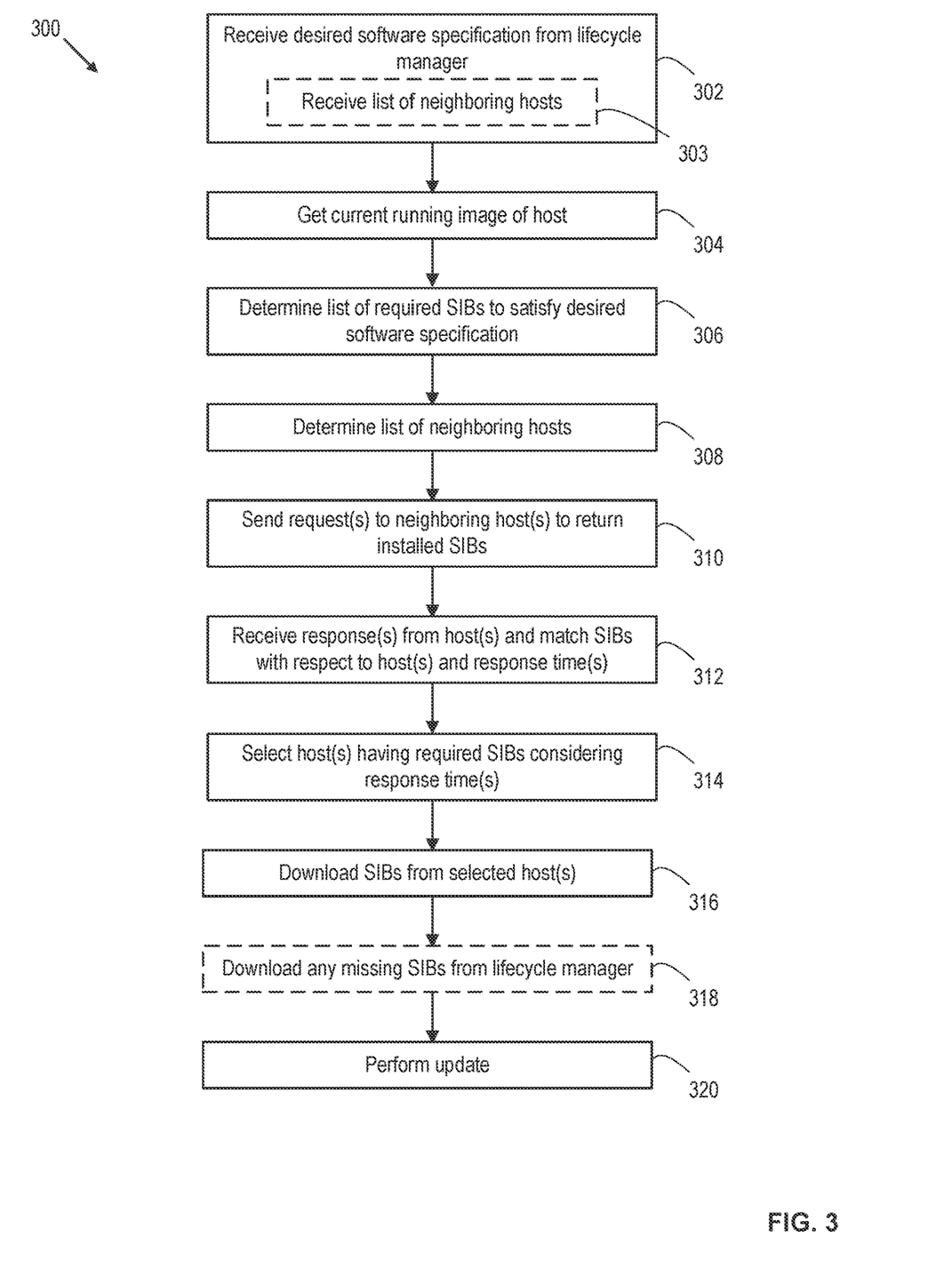
FIG. 3 is a flow diagram depicting a method of upgrading a host in a cluster under lifecycle management according to an embodiment.

FIG. 3 is a flow diagram depicting a method 300 of upgrading a host in a cluster under lifecycle management according to an embodiment. Method 300 begins at step 302, where host daemon 214 in a host 120 being upgraded receives a desired software specification from lifecycle manager 144 as determined from desired host state 142). The desired software specification can include, for example, a desired image to be installed having a list of desired SIBs. In some embodiments, host 120 can also receive a list of neighboring hosts from lifecycle manager 144 (step 303). In other embodiments, host 120 can autonomously determine a list of neighboring hosts as discussed below and step 303 is omitted.

At step 304, host daemon 214 obtains running image 154 of host 120 and identifies the SIBs used to install running image 154. In embodiments, host daemon 214 obtains image metadata from image DB 228, which includes a profile of running image 154 and a list of SIBs. At step 306, host daemon 214 determines a list of required SIBS to satisfy the desired software specification. Host daemon 214 can compare the SIBs of the desired software specification against those of the running image 154 to identify which SIB s are needed for the upgrade operation.

At step 308, host daemon 214 determines a list of neighboring hosts. In embodiments, host daemon 214 can execute a command line interface (CLI) command to determine a list of hosts on the same sub-network (subnet). Internally, the CLI command can use address resolution protocol (ARP) to generate an ARP table of responding hosts. Alternatively, as discussed above, lifecycle manager 144 can send a list of neighboring hosts (step 303).

At step 310, host daemon 214 sends request(s) to neighboring host(s) to return installed SIBs based on the list determined in step 308 or received in step 303. At step 312, host daemon 214 receives response(s) from host(s) with list(s) of installed SIBs. Host daemon 214 matches SIBs with hosts and corresponding response times (the time taken to receive the list of installed SIBs since the request for each host).

At step 314, host daemon 214 selects host(s) having the required SIBS based on the associated response times. Host daemon 214 can prefer hosts with shorter response times over hosts with longer response times for the same SIBs. At step 316 host daemon 214 downloads the required SIB s from the selected host(s). In some cases, one or more SIBs required for the upgrade may still be missing. Thus, at optional step 318, host daemon 214 obtains any missing SIBs from lifecycle manager 144. At step 320, having obtained all the necessary SIBs, host daemon 214 initiates the upgrade operation.

Figure 4:
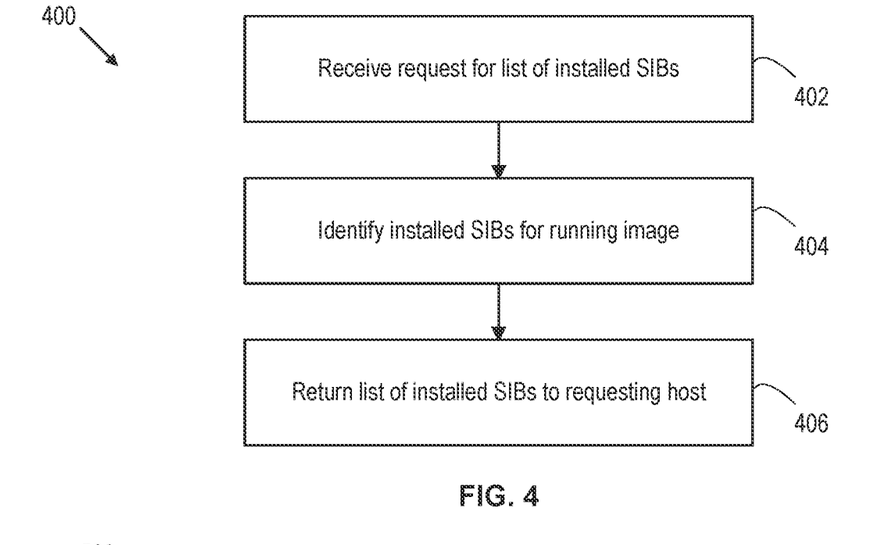
FIG. 4 is a flow diagram depicting a method of servicing requests for installed SIBs from neighboring hosts according to an embodiment.

FIG. 4 is a flow diagram depicting a method 400 of servicing requests for installed SIBS from neighboring hosts according to an embodiment. Method 400 begins at step 402, where SIB listing service 234 receives a request for a list of installed SIBs from a neighboring host. At step 404, SIB listing service 234 identifies SIBs used to install running image 154 (as described above in steps 304 and 306). At step 406, SIB listing service 234 returns a list of installed SIBs to each requesting host.

Figure 5:
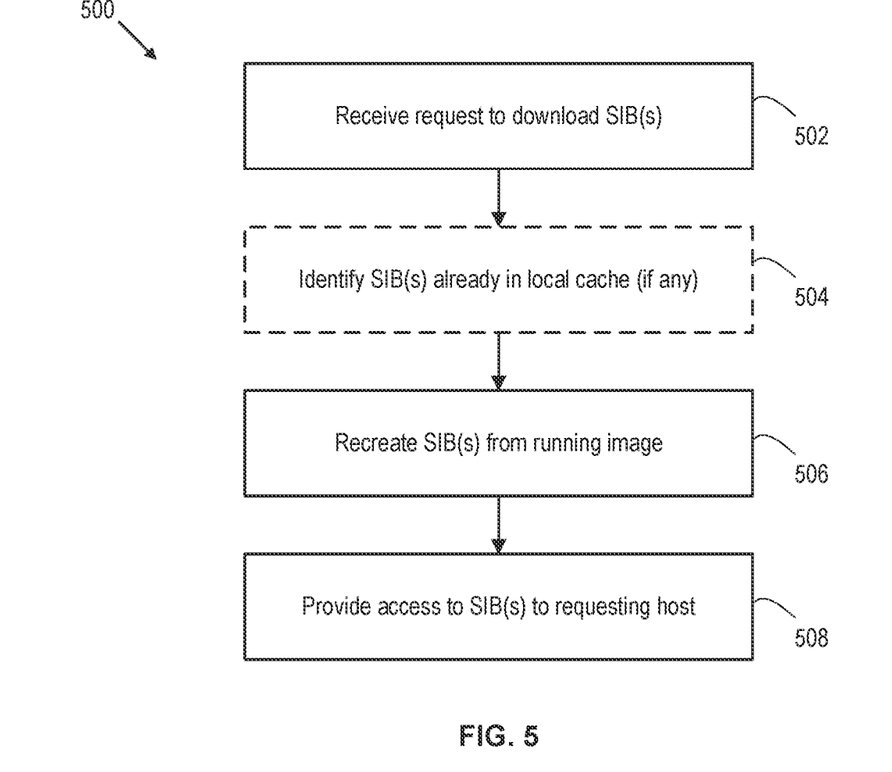
FIG. 5 is a flow diagram depicting a method of providing SIBs for download by a neighboring host according to an embodiment.

FIG. 5 is a flow diagram depicting a method 500 of providing SIBs for download by a neighboring host according to an embodiment. Method 500 begins at step 502, where SIB listing service 234 receives a request to download SIB(s) from a neighboring host. At step 504, SIB listing service 234 identifies SIB(s) already in the local cache (if any). At step 506. SIB listing service 234 commands SIB generator 230 to recreate SIB(s) from running image. The process of step 506 is described further below. At step 508, SIB listing service 234 provides access to the requested SIB(s) to the requesting host so that the requesting host can download the SIBs.

Figure 6:
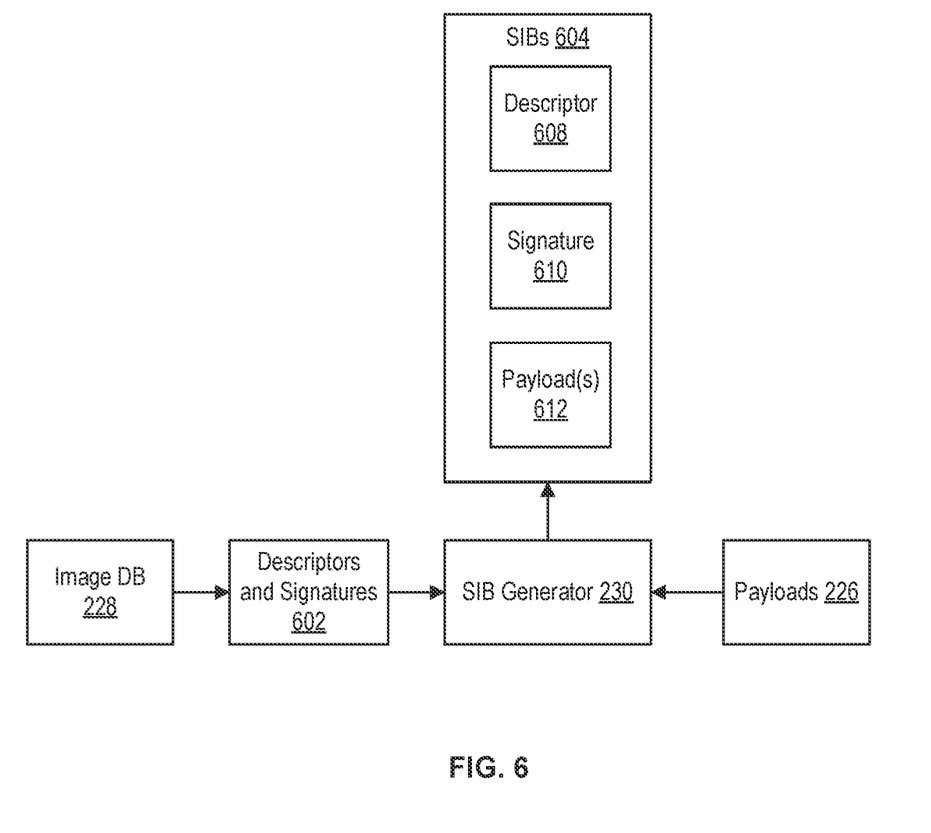

FIG. 6 is a block diagram depicting generation of SIBs from a host according to an embodiment. SIB generator 230 takes as input metadata for running image 154 (e.g., descriptors and signatures 602 from image DB 228) and payloads 226. SIB generator 230 generates SIBs 604. Each SIB 604 includes a descriptor 608 (e.g., an XML file), a signature 610 (e.g., for verification of source), and one or more payloads 612. A process for generating SIBS 604 from image DB 228 and payloads 226 is described below.

Figure 7:
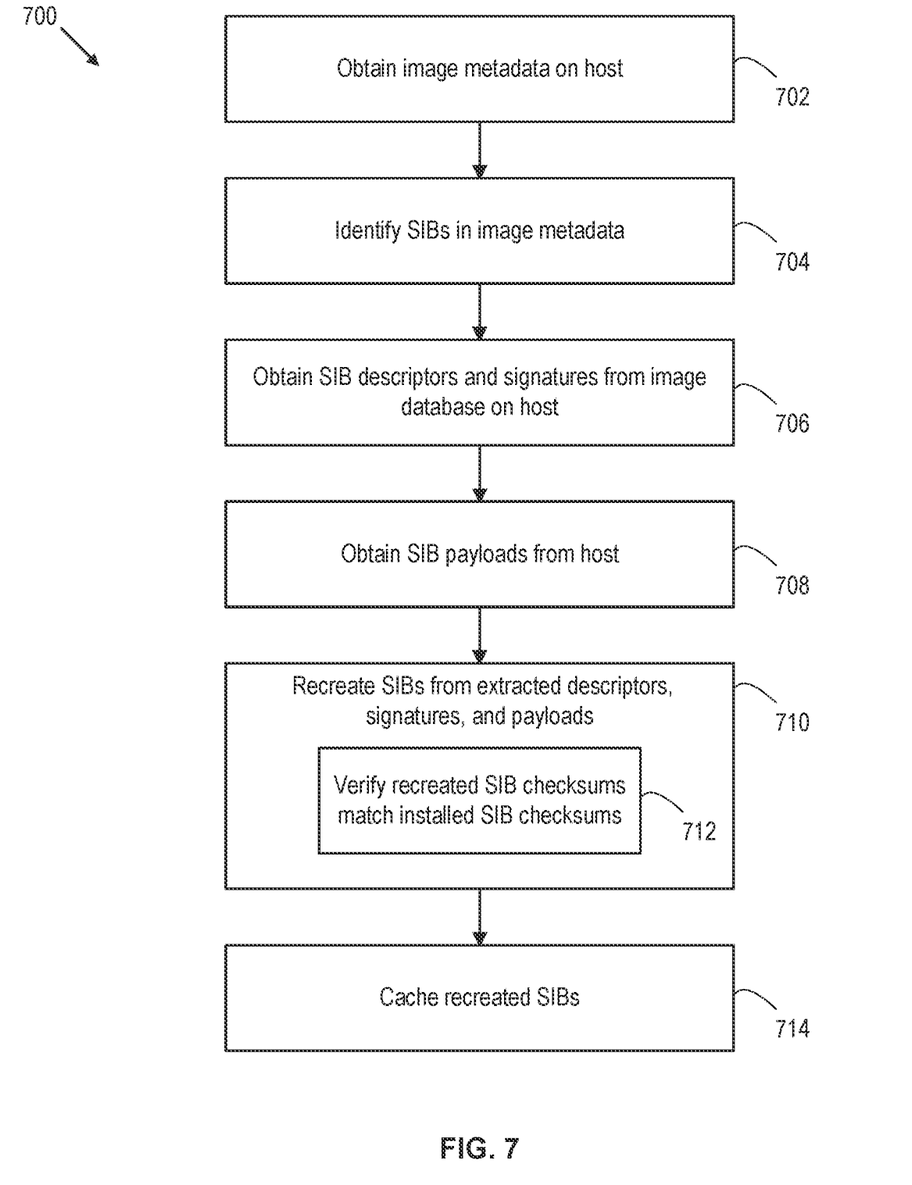
FIG. 7 is a flow diagram depicting a method of extracting a software image from a seed host according to embodiments.

FIG. 7 is a flow diagram depicting a method 700 of extracting a software image from a seed host according to embodiments. Software is installed on a host 120 using a software image, which results in running image 154 implementing hypervisor 150. However, the SIBs used to install running image 154 are not stored on host 120 initially. Thus, the SIB s are reconstructed from running image 154.

Method 700 begins at step 702, where SIB generator 230 obtains image metadata on host 120 for running image 154. In embodiments, SIB generator 230 can read image metadata from image DB 228. Image metadata can include, for example, an identifier for the running image 154, a description of running image 154, a list of installed SIBs, a list of payloads) for each install SIB, and the like. Image metadata can further include, for each installed SIB, a SIB descriptor having a name for the SIB, a version of the SIB, a description of the SIB, dependencies for the SIB, a list of files installed by the SIB, a list of payloads in the SIB a checksum of the SIB, and the like. Image metadata can further include, for each installed SIB, a SIB signature.

At step 704, SIB generator 230 identifies the installed SIBS from image metadata. At step 706, SIB generator 230 obtains SIB descriptors and SIB signatures from image database 228. At step 708, SIB generator 230 obtains SIB payloads 226 from host 120 referenced in image metadata for each installed SIB. At step 710, SIB generator 230 recreates the installed SIBS from the extracted descriptors, signatures, and payloads. At step 712, SIB generator 230 verifies the recreated SIB checksums matched the installed SIB checksums in the image metadata. At step 714, SIB generator 230 stores the recreated SIBs on host 120 for access by neighboring hosts (cached SIBs 232).

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of generating software installation bundles (SIBs) in a cluster of a virtualized computing system, the method comprising:
   receiving, at a host from a neighboring host in the cluster, a request to download the SIBs;
   obtaining, at the host, image metadata describing a running image of a hypervisor executing on the host;
   identifying, from the image metadata, a plurality of SIBs used to install the running image on the host;
   obtaining, from storage on the host, payloads referenced in the image metadata for the SIBs;
   recreating the SIBs from the payloads; and
   storing the recreated SIBs for access by the neighboring host.

2. The method of claim 1, further comprising:
   obtaining, at the host from the image metadata, SIB descriptors and SIB signatures for the plurality of SIBs;
   wherein the SIBs are recreated from the SIB descriptors, the SIB signatures, and the payloads.

3. The method of claim 1, further comprising:
   verifying, by the host, checksums of the SIBs as recreated against checksums for the SIBs as stored in the image metadata.

4. The method of claim 1, further comprising:
   downloading, by the neighboring host from the host, the SIBs as recreated; and
   executing an upgrade of another hypervisor executing in the neighboring host using the SIBs as recreated.

5. The method of claim 4, further comprising:
   determining, by the neighboring host, a list of required SIBs to satisfy a desired software specification;
   identifying, by the neighboring host, the host in the cluster from which to obtain the SIBs.

6. The method of claim 5, wherein the neighboring host receives a list of hosts having the host from a lifecycle manager.

7. The method of claim 5, wherein the neighboring host determines the host autonomously.

8. A non-transitory computer readable medium comprising instructions to be executed in a computing device to cause the computing device to carry out a method of generating software installation bundles (SIBs) in a cluster of a virtualized computing system, the method comprising:
   receiving, at a host from a neighboring host in the cluster, a request to download the SIBs;
   obtaining, at the host, image metadata describing a running image of a hypervisor executing on the host;
   identifying, from the image metadata, a plurality of SIBs used to install the running image on the host;
   obtaining, from storage on the host, payloads referenced in the image metadata for the SIBs;
   recreating the SIBs from the payloads; and
   storing the recreated SIBs for access by the neighboring host.

9. The non-transitory computer readable medium of claim 8, further comprising:
   obtaining, at the host from the image metadata, SIB descriptors and SIB signatures for the plurality of SIBs;
   wherein the SIBs are recreated from the SIB descriptors, the SIB signatures, and the payloads.

10. The non-transitory computer readable medium of claim 8, further comprising:
    verifying, by the host, checksums of the SIBs as recreated against checksums for the SIBs as stored in the image metadata.

11. The non-transitory computer readable medium of claim 8, further comprising:
    downloading, by the neighboring host from the host, the SIBs as recreated; and
    executing an upgrade of another hypervisor executing in the neighboring host using the SIBs as recreated.

12. The non-transitory computer readable medium of claim 11, further comprising:
    determining, by the neighboring host, a list of required SIBs to satisfy a desired software specification;
    identifying, by the neighboring host, the host in the cluster from which to obtain the SIBs.

13. The non-transitory computer readable medium of claim 12, wherein the neighboring host receives a list of hosts having the host from a lifecycle manager.

14. The non-transitory computer readable medium of claim 13, wherein the neighboring host determines the host autonomously.

15. A virtualized computing system having a cluster comprising hosts connected to a network, the virtualized computing system comprising:
    a host having a hardware platform that includes a central processing unit (CPU) and a system memory; and
    a neighboring host to the host;
    the hardware platform of the host configured to execute software to:
       receive, from the neighboring host, a request to download software installation bundles (SIBs);
       obtain image metadata describing a running image of a hypervisor executing on the host;

identify, from the image metadata, a plurality of SIBs used to install the running image on the host;

obtain, from storage on the host, payloads referenced in the image metadata for the SIBs;

recreate the SIBs from the payloads; and store the recreated SIBs for access by the neighboring host.

16. The virtualized computing system of claim 15, wherein the host is configured to obtain, from the image metadata, SIB descriptors and SIB signatures for the plurality of SIBs, and wherein the SIBs are recreated from the SIB descriptors, the SIB signatures, and the payloads.

17. The virtualized computing system of claim 15, wherein the host is configured to verify checksums of the SIBs as recreated against checksums for the SIBs as stored in the image metadata.

18. The virtualized computing system of claim 15, wherein the neighboring host is configured to:

download, from the host, the SIBs as recreated; and execute an upgrade of another hypervisor executing in the neighboring host using the SIBs as recreated.

19. The virtualized computing system of claim 18, wherein the neighboring host is configured to:

determine a list of required SIBs to satisfy a desired software specification; and identify the host in the cluster from which to obtain the SIBs.

20. The virtualized computing system of claim 19, wherein the neighboring host receives a list of hosts having the host from a lifecycle manager.

* * * * *